United States Patent
Dickson et al.

(10) Patent No.: US 10,023,285 B2
(45) Date of Patent: Jul. 17, 2018

(54) FRAME INSULATION PROVIDING ENHANCED DRAINAGE FEATURES

(71) Applicant: The Boeing Company, Chicago, IL (US)

(72) Inventors: Jennifer Lynn Dickson, Charleston, SC (US); Jesse Vitalez Tibayan, Berkley, SC (US); Irina Alekseevna Zakharova, Daniel Island, SC (US)

(73) Assignee: The Boeing Company, Chicago, IL (US)

( * ) Notice: Subject to any disclaimer, the term of this patent is extended or adjusted under 35 U.S.C. 154(b) by 349 days.

(21) Appl. No.: 14/885,041

(22) Filed: Oct. 16, 2015

(65) Prior Publication Data
US 2017/0106965 A1    Apr. 20, 2017

(51) Int. Cl.
   B64C 1/00    (2006.01)
   B64C 1/06    (2006.01)
   B64F 5/10    (2017.01)

(52) U.S. Cl.
   CPC .............. B64C 1/067 (2013.01); B64C 1/066 (2013.01); B64F 5/10 (2017.01)

(58) Field of Classification Search
   CPC ........... B64C 1/067; B64C 1/066; B64C 1/40; B64C 1/403; B64F 5/10
   See application file for complete search history.

(56) References Cited

U.S. PATENT DOCUMENTS

| | | | |
|---|---|---|---|
| 5,901,519 A | 5/1999 | Wilson | |
| 8,167,019 B2* | 5/2012 | Muranaka | B60J 7/0038 160/202 |
| 2011/0024058 A1* | 2/2011 | Kernmayer | B60R 13/02 160/113 |
| 2011/0305864 A1* | 12/2011 | Masuda | B60N 2/5833 428/86 |

(Continued)

FOREIGN PATENT DOCUMENTS

| | | | | |
|---|---|---|---|---|
| DE | 2035807 | | 1/1972 | |
| DE | 9200494 | * | 3/1992 | ............. B64C 1/066 |

(Continued)

OTHER PUBLICATIONS

"PatenttranslateDE9200494".*

(Continued)

*Primary Examiner* — Assres H Woldemaryam
(74) *Attorney, Agent, or Firm* — Duft Bornsen & Fettig LLP (57) ABSTRACT

Systems and methods are provided for insulation and moisture drainage. One exemplary system comprises a liner. The liner covers a frame element of an aircraft. The liner includes a first waterproof lip that is attached to a first insulator and protrudes towards the frame element. The first waterproof lip and the first insulator form a first drainage channel for the frame element. A second waterproof lip is attached to a second insulator and protrudes towards the frame element. The second waterproof lip and the second insulator form a second drainage channel for the frame element. The first (Continued)

waterproof lip and the second waterproof lip each include a lengthwise fixation element that attaches the first waterproof lip to the second waterproof lip, sealing at least a portion of the lengthwise gap.

24 Claims, 13 Drawing Sheets

(56) References Cited

U.S. PATENT DOCUMENTS

2012/0024741 A1* 2/2012 Beatty ............... A45C 11/00
 206/521
2015/0274278 A1 10/2015 Lucas et al.

FOREIGN PATENT DOCUMENTS

DE 9200494 U1 3/1992
DE 102010006564 A1 8/2011

OTHER PUBLICATIONS

AERO: Controlling Nuisance Moisture, The Boeing Company, Aug. 27, 2015, available at http://www.boeing.com/commercial/aeromagazine/aero_05/m/m01/index.html.
European Search Report re: 16193739.6-1754, European Patent dated Mar. 15, 2017.

* cited by examiner

FRAME INSULATION PROVIDING ENHANCED DRAINAGE FEATURES

FIELD

The disclosure relates to the field of insulation, and in particular, to insulation for aircraft.

BACKGROUND

Aircraft may use insulation to prevent internal components from experiencing substantial temperature shifts when the aircraft changes elevation between landing and flight. For example, aircraft insulation in a cabin of a passenger aircraft ensures that passengers remain comfortable even when the temperature outside the aircraft varies substantially.

While an aircraft is in flight, it is possible that some moisture may rise from the cabin through the insulation, and then condense out of the air and freeze to the inside of the skin of the aircraft above the ceiling of the passenger compartment. When the aircraft lands and moisture has frozen to the inner side of the skin of the aircraft, the moisture is exposed to warmer temperatures, and therefore melts. Most of the moisture is drained along the skin of the aircraft towards the bottom of the aircraft, without entering the cabin. However, in certain cases, some moisture may drip through the insulation into the cabin, which is undesirable for both passengers and cargo. Thus, enhanced techniques for handling moisture flow within an aircraft are desired.

SUMMARY

Embodiments described herein enhance aircraft insulation such as cap strips for the ribs/frame of an aircraft. A cap strip insulating a frame of an aircraft may include a lengthwise gap that enables brackets to protrude from the frame towards the interior of the aircraft. However, moisture will leak from the skin of the aircraft down the frame of the aircraft, and will drip through the lengthwise gap in the cap strip into the aircraft cabin. The cap strips described herein include tabs/protrusions/lips that are capable of substantially sealing such lengthwise gaps, reducing the amount of leaking moisture entering the aircraft cabin through such gaps. In short, dripping moisture is contained by the cap strip, and drains along drainage channels defined by the cap strip, without entering the aircraft cabin.

One exemplary embodiment comprises a liner. The liner covers a frame element of an aircraft. The liner includes a first waterproof lip that is attached to a first insulator and protrudes towards the frame element. The first waterproof lip and the first insulator form a first drainage channel for the frame element. A second waterproof lip is attached to a second insulator and protrudes towards the frame element. The second waterproof lip and the second insulator form a second drainage channel for the frame element. The first waterproof lip and the second waterproof lip each include a lengthwise fixation element that attaches the first waterproof lip to the second waterproof lip, sealing at least a portion of the lengthwise gap.

Another embodiment comprises a liner for a frame element of an aircraft fuselage. The liner includes elongate insulating portions covering the frame element along a length of the frame element, including ends that join to define a lengthwise slit between the elongate insulating portions. The liner also includes lengthwise waterproof tabs positioned on the ends of the insulating portions, each waterproof tab having a fixation element adapted to attach the waterproof tab to a fixation element of another waterproof tab. The waterproof tabs protrude towards the ends of the frame elements and divert liquid into channels within the liner while the waterproof tabs are affixed to each other via the fixation elements.

Another embodiment is an apparatus that includes a frame element of an aircraft fuselage, multiple brackets fixedly attached to the frame element, and a cap strip liner for the frame element. The cap strip liner includes elongate insulating portions covering the frame element along a length of the frame element, having ends that define a lengthwise slit. The cap strip liner also includes lengthwise waterproof tabs positioned on the ends of the insulating portions, each waterproof tab having a fixation element adapted to attach the waterproof tab to a fixation element of another waterproof tab. The waterproof tabs prevent liquid from traveling through the lengthwise slit while the waterproof tabs are affixed to each other via the fixation elements.

Another embodiment is a method. The method includes selecting a liner for a frame element of an aircraft and installing the liner onto the frame element. The method further includes affixing tabs of the liner to each other, thereby enabling the liner to divert moisture from the frame element into channels within the liner, the tabs each defining at least one wall of one of the channels.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
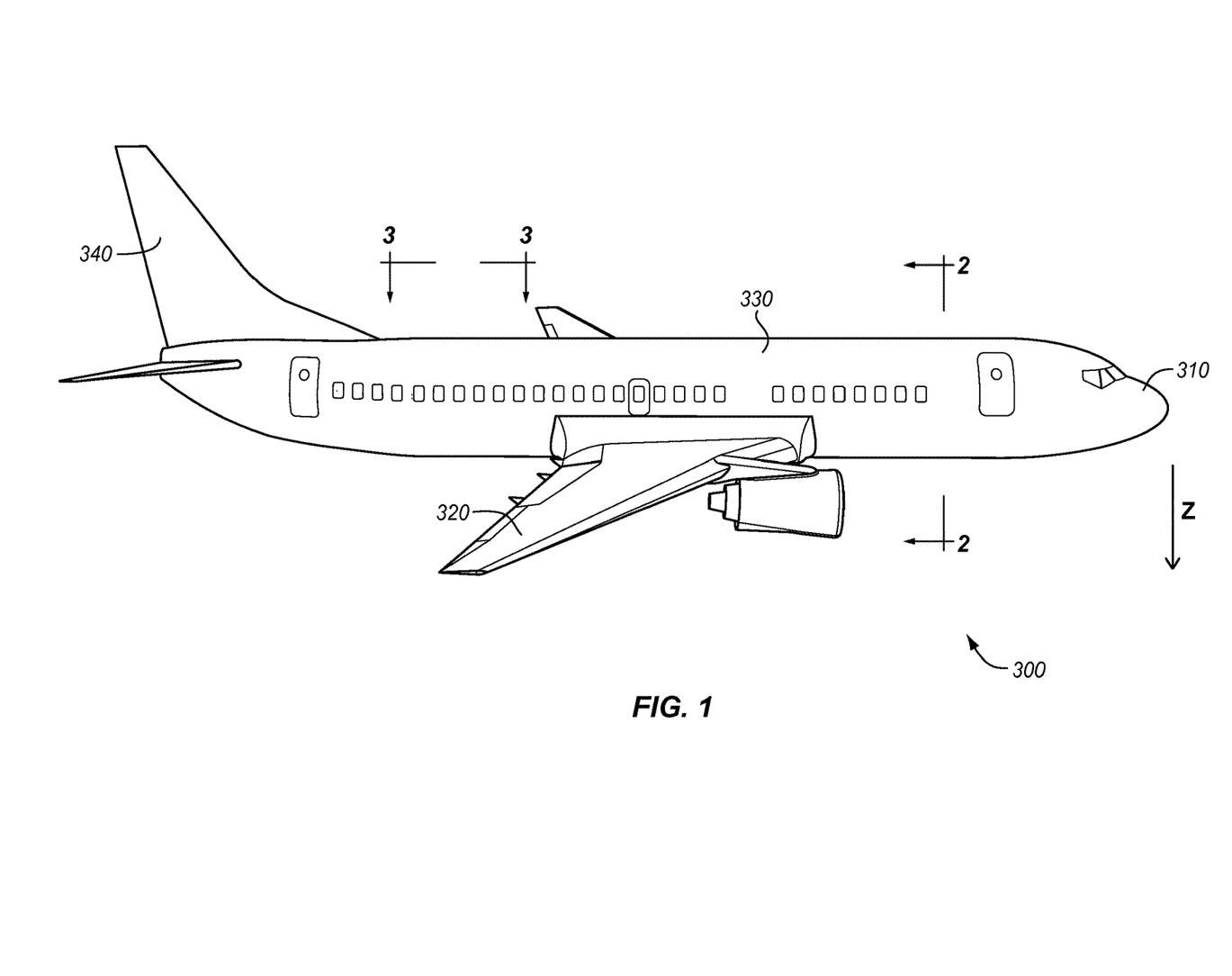
FIG. 1 is a diagram of an aircraft in an exemplary embodiment.

FIGS. 1-5 illustrate moisture flow in an exemplary aircraft, while FIGS. 6-10 illustrate systems that reduce the potential for condensed moisture to enter the interior of a fuselage of such an exemplary aircraft. FIG. 1 is a diagram of an aircraft 300 in an exemplary embodiment. According to FIG. 1, aircraft 300 includes nose 310, wings 320, tail 340, and fuselage 330. FIG. 1 also illustrates a downward direction (Z) indicating the expected direction in which the force of gravity will pull objects, such as liquid water, onboard aircraft 300.

Figure 2:
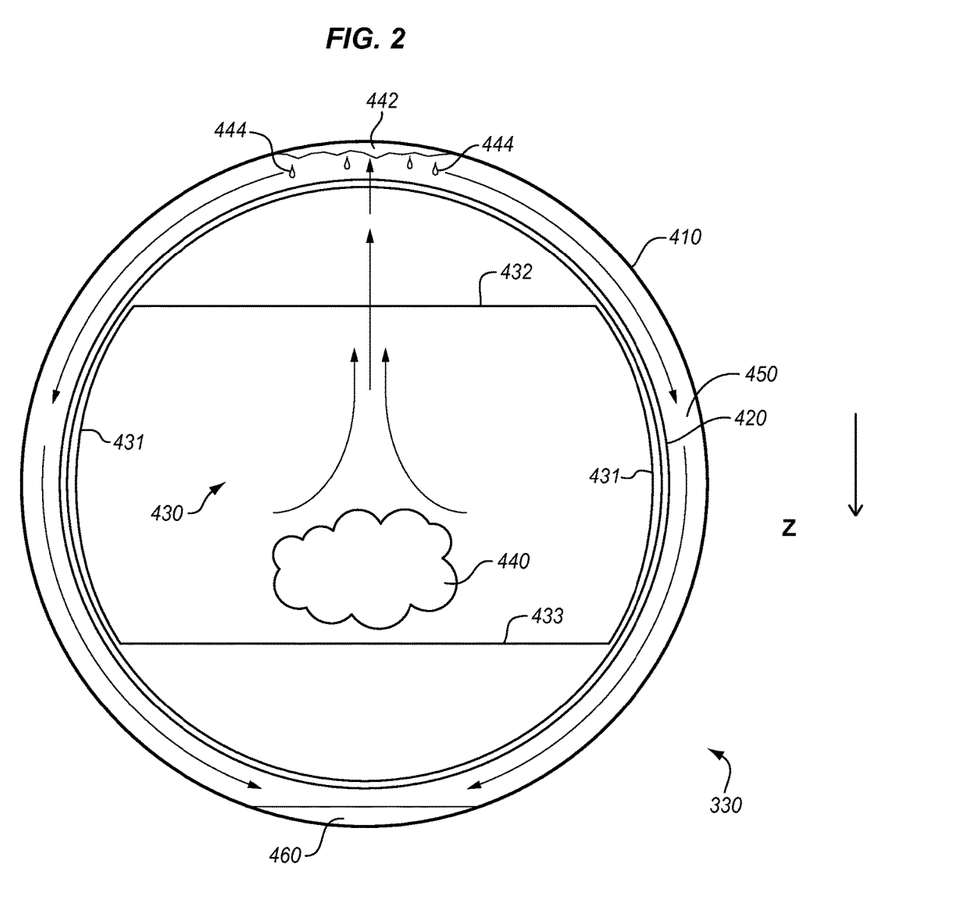
FIG. 2 is a diagram illustrating moisture flow in an aircraft in an exemplary embodiment.

FIG. 2 is a cross-section view of aircraft 300 indicated by reference number 2 in FIG. 1. FIG. 2 illustrates a circular portion of aircraft fuselage 330, which includes floor 433, ceiling 432, and sidewalls 431. Passengers in aircraft 300 may congregate in cabin 430 during flight. As shown in FIG. 2, inside of fuselage 330 (e.g., in cabin 430), respiration and other sources of water cause moisture 440 to enter the air in cabin 430. For example, warm exhaled air includes moisture 440, and rises upward. Some of this warm, moist air rises through ceiling 432. Furthermore, some warm air continues to rise upward through insulation 420 into a space 450 between insulation 420 and aircraft skin 410.

At high altitude skin 410, cooled by the outside air, is below freezing, causing water to condense out of the air and freeze onto skin 410, as shown by ice 442. Upon descending to a lower altitude (e.g., for landing) ice 442 melts into water droplets 444, which travel through space 450 into drainage channel 460. When there are gaps in insulation 420 some water droplets 444 will melt from ice 442, pass through insulation 420 and drip from ceiling 432 onto passengers, which is undesirable. The size of space 450 has been substantially exaggerated in FIG. 2 in order to highlight the path through which droplets 444 are intended to travel.

Figure 3:
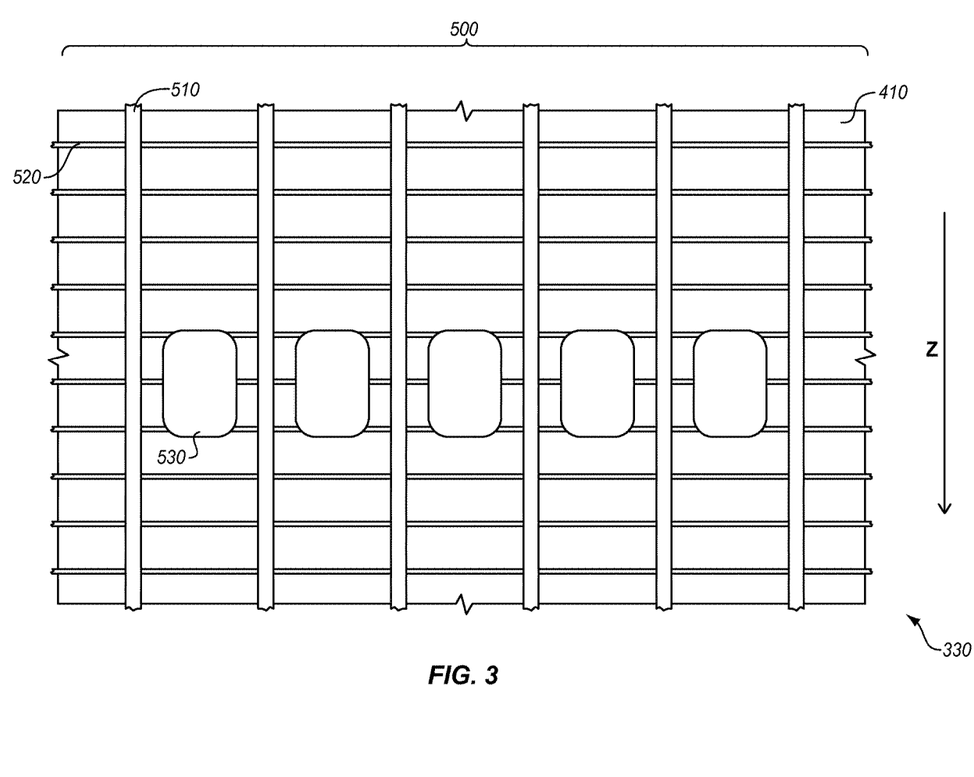
FIG. 3 is a diagram illustrating section of aircraft fuselage in an exemplary embodiment.

FIG. 3 is a diagram illustrating a section 500 of fuselage 330 of aircraft 300 in an exemplary embodiment. FIG. 3 is a view shown as reference number 3 in FIG. 1. In FIG. 3, various structural components (510, 520, 530, 410) are illustrated without insulation for clarity. Specifically, multiple stringers 520 connect frame elements 510 (e.g., ribs of the aircraft) together. Windows (e.g., window 530) penetrate through skin 410, and are illustrated for context to ensure clarity in understanding the view presented.

Figure 4:
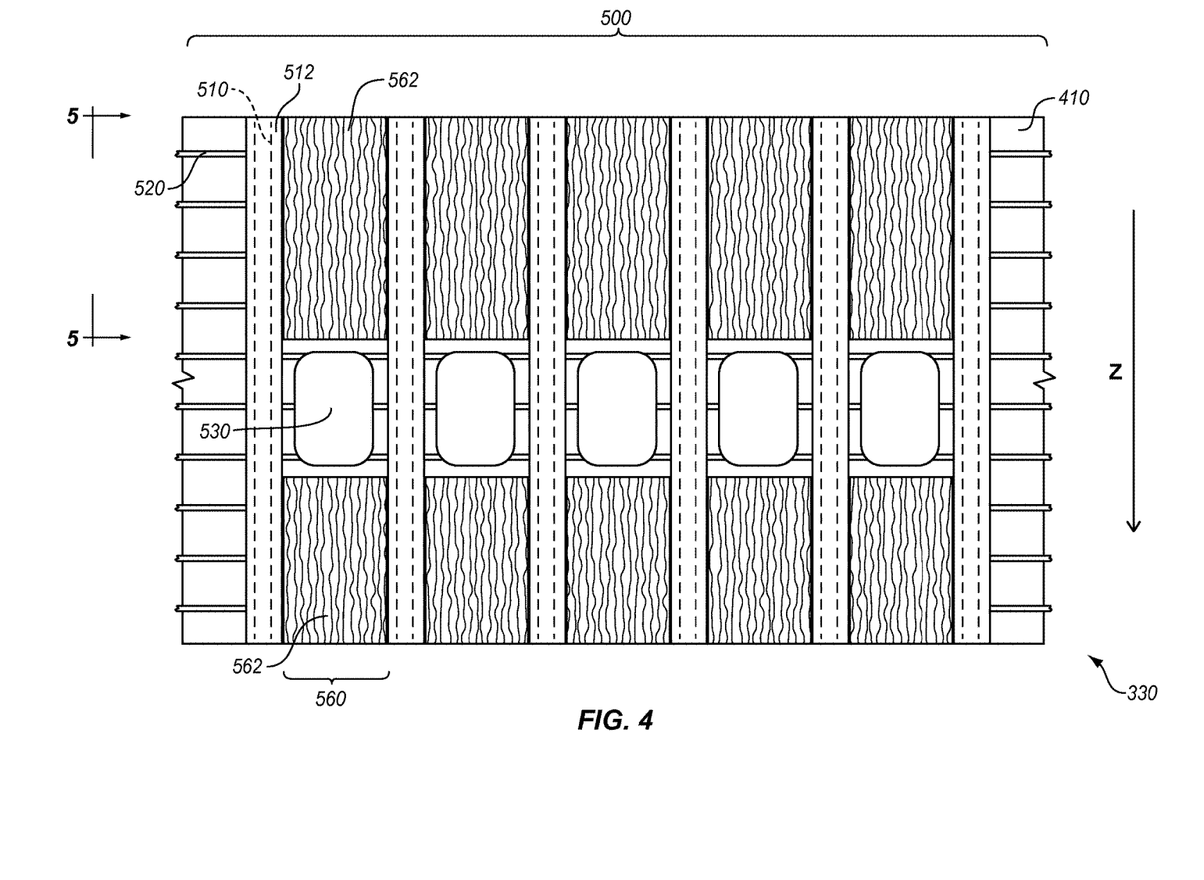
FIG. 4 is a diagram illustrating section of insulated aircraft fuselage in an exemplary embodiment.

FIG. 4 is a diagram illustrating section 500 of fuselage 330 with insulation in an exemplary embodiment. FIG. 4 also utilizes the view shown as reference number 3 in FIG. 1. In FIG. 4, the various structural components (510, 520, 530, 410) depicted in FIG. 3 are now insulated. Specifically, bays 560 formed between frame elements 510 are filled with insulating bay blankets 562. Meanwhile, each frame element 510 is itself covered by an insulating liner (e.g., a cap strip) 512. Liner 512 is waterproof (e.g., impermeable to water, such that water cannot cross directly through the material of liner 512 from either the cabin 430 of aircraft 300 to skin 410, or from skin 410 of aircraft 300 to cabin 430). Although some moisture may travel between gaps in liner 512, liner 512 prevents such moisture from dripping back into the cabin, instead draining moisture around the perimeter of the cabin 430 drainage channel 460 (e.g., a keel area). Liner 512 is also thermally insulating, ensuring that passengers within aircraft 300 do not experience substantial temperature drops when aircraft 300 travels at cruising altitude, and further ensuring that liquid water does not permeate through insulated liner 512 when flowing along insulated liner 512. Further discussion focuses on an insulated liner 512 and its corresponding frame element 510.

Figure 5:
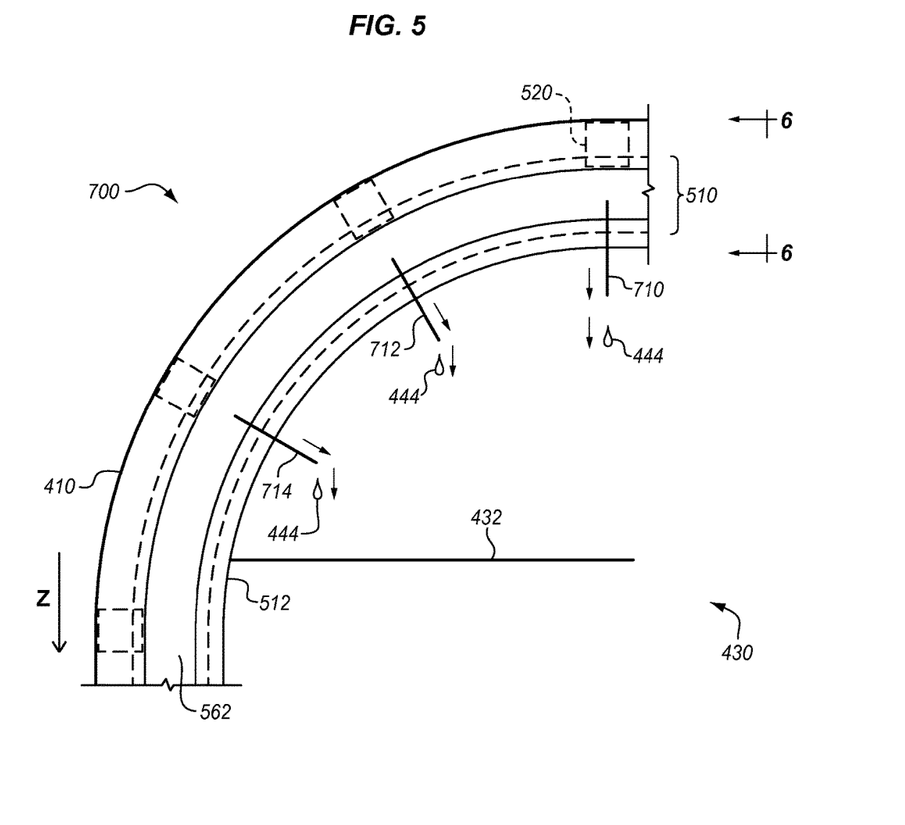
FIG. 5 is a diagram illustrating a portion of an insulated frame element in an exemplary embodiment.

FIG. 5 is a diagram illustrating a portion of an insulated frame element 510 of an aircraft in an exemplary embodiment. Frame element 510 is illustrated by the bold dashed lines of FIG. 5, and is obscured by liner 512, bay blanket 562, and stringer 520. Specifically, FIG. 5 is a view of a portion 700 of a frame element 510 situated at the top of aircraft 300, as shown in reference number 5 of FIG. 4. FIG. 5 illustrates that multiple brackets (710, 712, 714) are attached to frame element 510. Brackets (710, 712, 714) may be used for any suitable purpose, such as for mounting air ducts or electrical wiring within aircraft 300. The brackets (710, 712, 714) penetrate through insulated liner 512, and therefore provide a pathway for droplets 444 to travel, allowing droplets 444 to drip from frame element 510 through ceiling 432 into the cabin 430 of aircraft 300.

Figure 6:
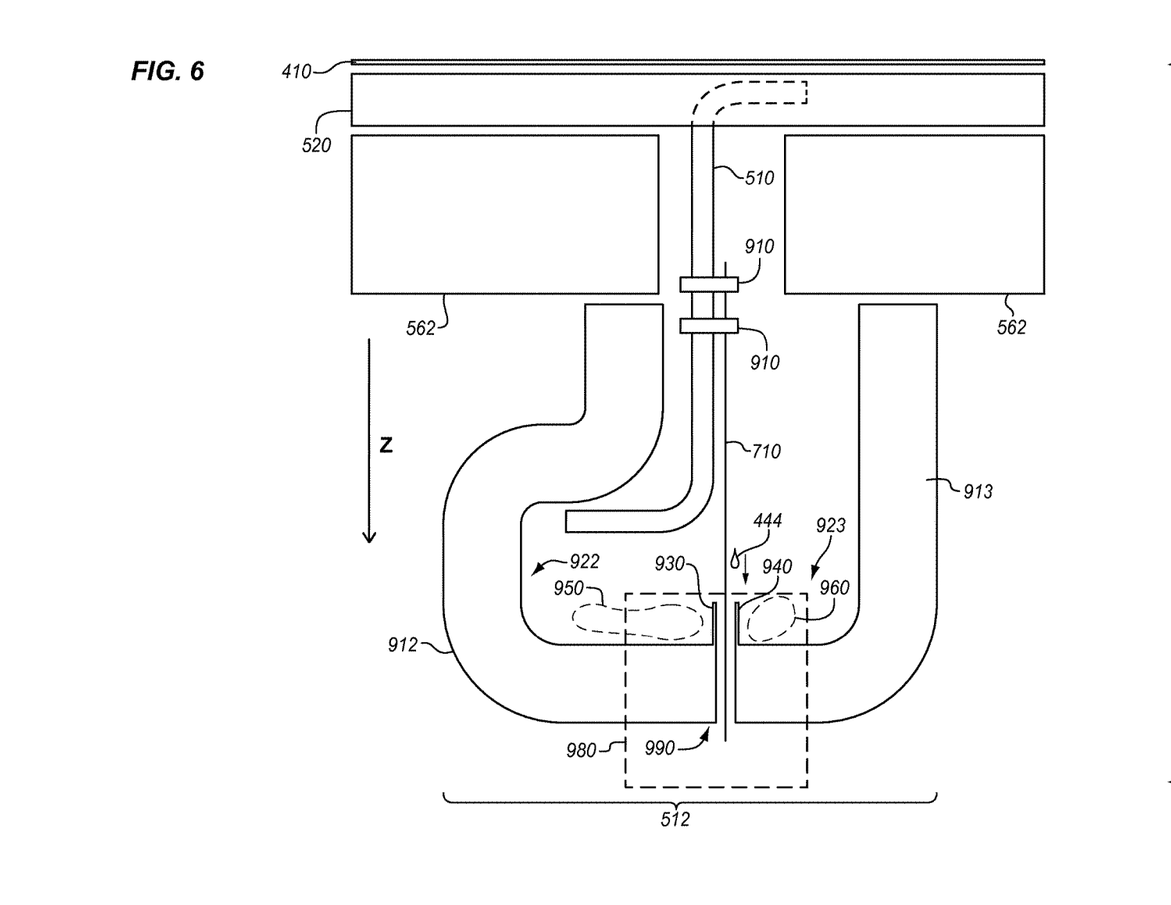
FIG. 6 is a diagram illustrating a cross-section of an insulated frame element in an exemplary embodiment.

FIG. 6 is a diagram illustrating a cross-section of an insulated frame element 510 in an exemplary embodiment. Specifically, in this exemplary embodiment FIG. 6 is a cross-section of a portion of frame element 510 at the top of aircraft 300. FIG. 6 is represented on FIG. 5 by reference number 6. FIG. 6 illustrates an exemplary frame element 510 having an "S" shaped cross-section, but any suitable cross-section may be used for frame element 510. Brackets 710 are attached to frame element 510 via one or more via fasteners 910 (e.g., rivets, bolts, screws, etc.).

Frame element 510 is surrounded by insulated liner 512. Liner 512 forms a cap strip around frame element 510, and liner 512 comprises two elongate/lengthwise insulators 912 and 913. As used herein, the elongate/lengthwise dimension of insulators 912 and 913 extends into the page. Specifically, frame element 510 extends hoopwise around fuselage 330 with liner 512 also extending in a hoopwise direction. Insulators 912 and 913 may be composed of a closed cell vinyl/nitrile foam, or other type of material.

As water droplets 444 drip down in the Z direction from frame element 510, they may drip into channels 950 and 960, or they may drip through gap 990 (i.e., an elongate/lengthwise slit/gap through which brackets 710 extend). To prevent moisture from pooling near gap 990 and dripping out of insulated liner 512, each insulator (912, 913) includes a corresponding elongate/lengthwise tab/lip (930, 940). These tabs/lips (930, 940) extend towards frame element 510 (e.g., for about one inch), ensuring that water dripping from frame element 510 lands in channels 950 and 960, which are partially defined by tabs 930 and 940, and are partially defined by sidewalls/channel walls 922 and 923 of insulators 912 and 913. Droplets 444 within the channels 950 and 960 are drained along liner 512 proximate to frame element 510, instead of dripping out of liner 512. Hence, the cabin of aircraft 300 is not precipitated upon by droplets 444.

Figure 7:
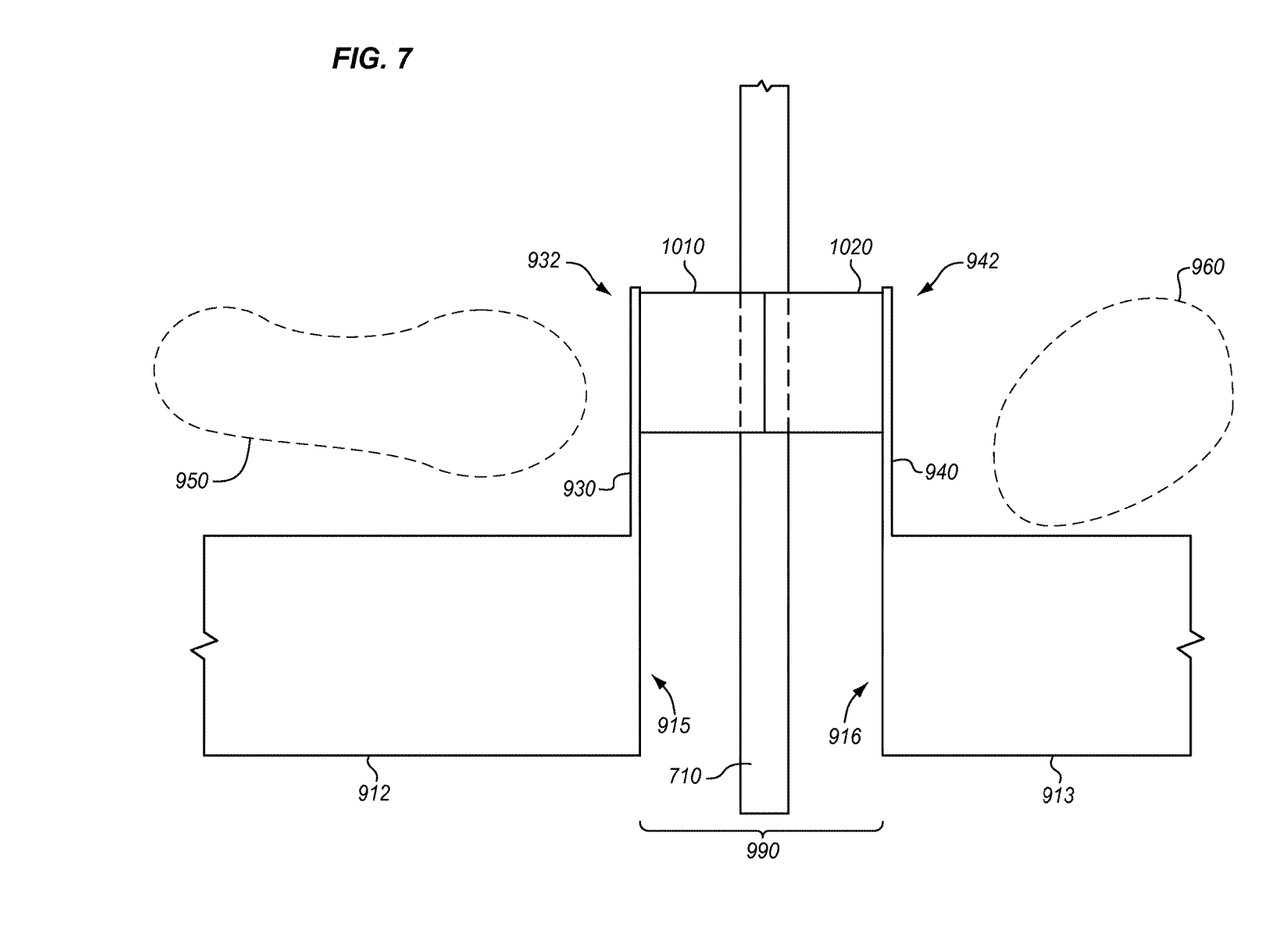
FIG. 7 is a zoomed in view of a cross-section of an insulated frame element in an exemplary embodiment.

FIG. 7 is a zoomed in view of a cross-section of an insulated frame element in an exemplary embodiment. Specifically, FIG. 7 corresponds with section 980 of FIG. 6. FIG. 7 illustrates gap 990 located between distal ends 915 and 916 of insulators 912 and 913, which are substantially abutting each other (i.e., bordering and/or touching at certain locations). In FIG. 7, gap 990 is due to a penetration of liner 512 that enables bracket 710 to protrude through liner 512 towards the inside of aircraft 300. FIG. 7 further illustrates fixation elements 1010 and 1020, which are attached to distal portions/ends/sides 932 and 942 of tabs 930 and 940, respectively. Fixation elements 1010 and 1020 may comprise discrete features such as buttons/snaps, or continuous features such as zippers, hook and loop fastener tape (e.g., VELCRO™), pressure sensitive adhesive strips, etc.

Portions (932, 942) of tabs 930 and 940 act as complementary channel walls to channel walls 922 and 923 of FIG. 6. Since tabs 930 and 940 are made of a waterproof material (e.g., vinyl), water cannot penetrate tabs 930 and 940, regardless of the narrow width of tabs 930 and 940. Tabs 930 and 940 may be attached to insulator 912 and 913 via any suitable waterproof means, such as gluing, waterproof stitching, being integrated together, etc. In short, waterproof tabs 930 and 940 prevent liquid from traveling through lengthwise gap 990 while waterproof tabs 930 and 940 are affixed to each other via fixation elements 1010 and 1020.

Figure 8:
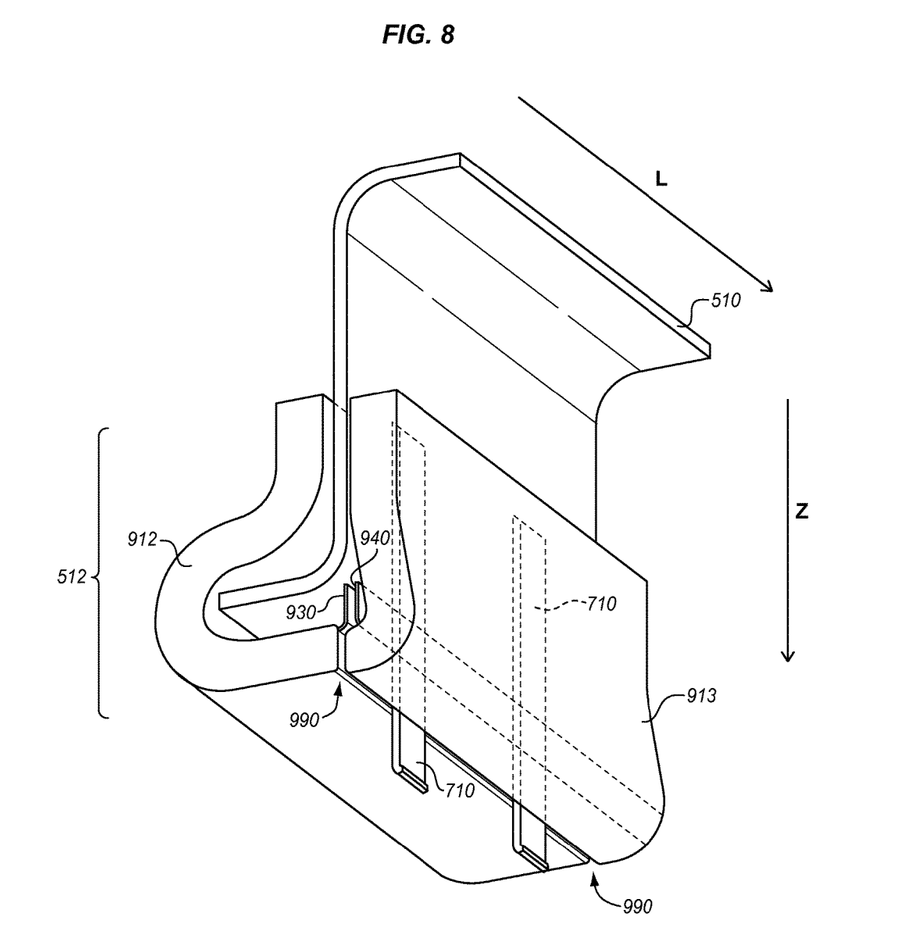
FIG. 8 is a perspective view of a portion of an insulated frame element in an exemplary embodiment.

FIG. 8 is a perspective view of a portion of a frame element 510 in an exemplary embodiment, represented by reference number 8 on FIG. 6. FIG. 8 illustrates the elongate/lengthwise dimension L, and further illustrates how gap 990 is a lengthwise slit through which brackets 710 penetrate. Because tabs 930 and 940 can be affixed to each other (e.g., removably affixed), gap 990 is sealed/closed proximate to tabs 930 and 940. The seal is only broken when brackets 710 penetrate between tabs 930 and 940, through gap 990 defined by insulated liner 512.

Using the techniques shown herein, moisture is prevented from leaking along gap 990 for an insulated liner of frame element 510 because the moisture is drawn off/diverted into channels. Locations for potential leaks are therefore drastically reduced, and are limited to locations wherein brackets 710 protrude through frame element 510. This dramatically reduces the amount of intrusion of moisture into a cabin of an aircraft, ensuring that passenger comfort is ensured and precipitation into the cabin is not a factor.

Figure 9:
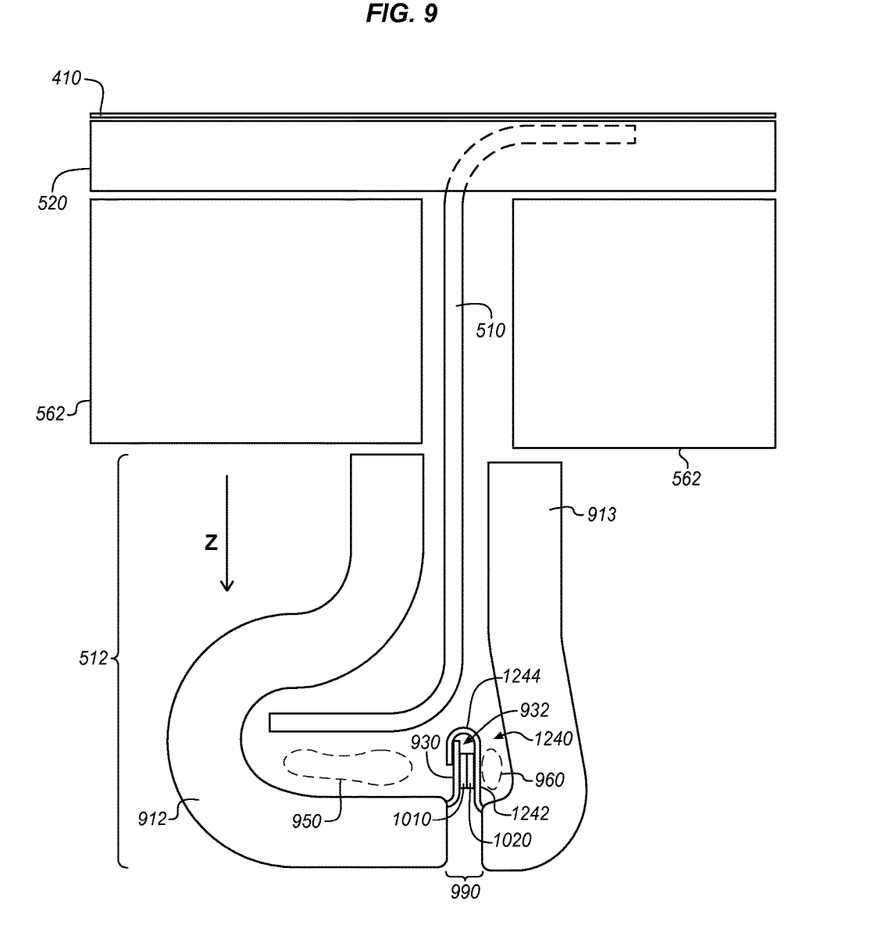
FIG. 9 is a diagram illustrating a cross-section of a further insulated frame element in an exemplary embodiment.

FIG. 9 is a diagram illustrating a cross-section of a further insulated frame element 510 in an exemplary embodiment. Specifically, FIG. 9 is a cross-section view of a frame element 510, represented on FIG. 5 by reference number 6. In FIG. 9, tab 930 is affixed via fixation element 1010 to fixation element 1020 of tab 1240. Tab 1240 includes base 1242, to which fixation element 1020 is attached, and arcing portion 1244, which overlaps distal portion 932 of tab 930. In this manner, water/moisture is diverted from flowing into gap 990, instead flowing into channels 950 and 960, which divert the water along the perimeter of aircraft 300. In short, moisture that would otherwise drop in between tabs 930 and 1200, then adhere and travel into gap 990, now flows either to the left of tab 930 or the right of tab 1240. In this embodiment, arcing portion 1244 is cut at location where brackets will be inserted between tabs 930 and 1240. This closure system, when it is not cut through by a penetrating bracket 710, provides for enhanced levels of moisture control and drainage.

Figure 10:
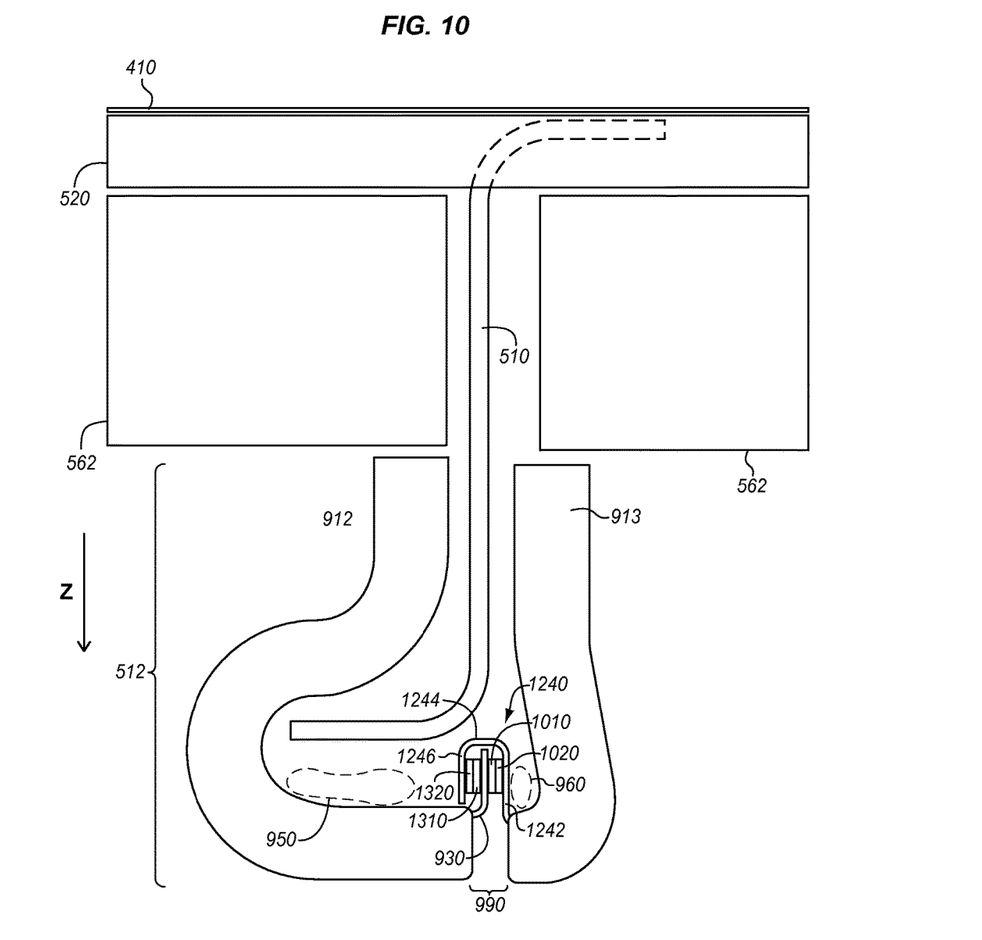
FIG. 10 is a diagram illustrating a cross-section of a further insulated frame element in an exemplary embodiment.

FIG. 10 is a diagram illustrating a cross-section of a further insulated frame element in an exemplary embodiment. Specifically, FIG. 10 is a cross-section view of frame element 510, represented on FIG. 5 by reference number 6. In FIG. 10, tab 930 is affixed twice to tab 1240. That is, tab 930 includes fixation element 1010 and 1310, and which are affixed to fixation elements 1020 and 1320 respectively. In this embodiment, tab 1240 includes base 1242 (to which fixation element 1020 is attached), arcing portion 1244 (which overlaps tab 930), and flap 1246 (to which fixation element 1320 is attached). In this manner, water that would otherwise touch between tabs 930 and 940, then adhere and travel into gap 990, now flows either to the left of tab 930 or the right of tab 1240. In this embodiment, arcing portion 1244 is cuts at locations where brackets will be inserted between tabs 930 and 1200.

Figure 11:
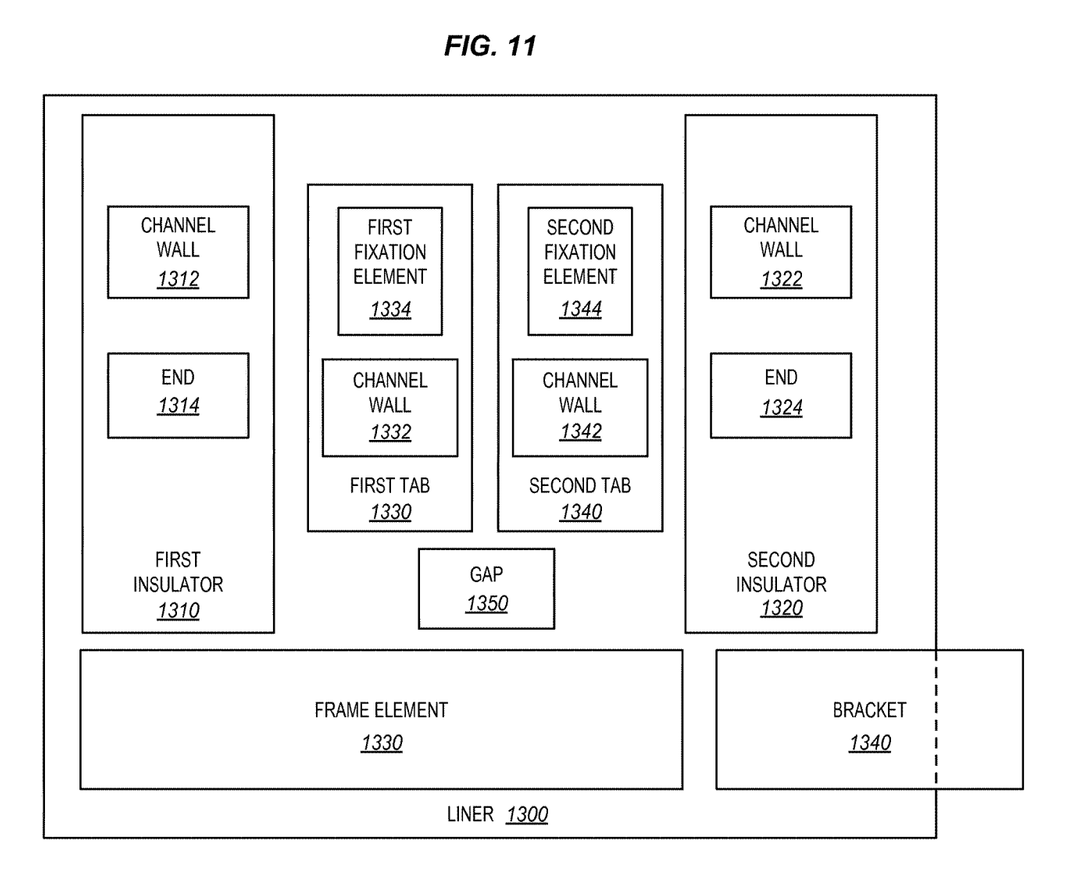
FIG. 11 is a block diagram of an insulated frame element in an exemplary embodiment.

FIG. 11 is a block diagram of an insulated frame element in an exemplary embodiment. Specifically, frame element 1330 is attached to bracket 1340, and liner 1300 covers frame element 1330. Liner 1300 comprises a first insulator 1310, which itself includes a channel wall 1312, and an end 1314. First tab 1330 is attached to end 1314, and first tab 1330 includes a channel wall 1332, and a first fixation element 1334. Liner 1300 further comprises a second insulator 1320, which itself includes a channel wall 1322, and an end 1324. Second tab 1340 is attached to end 1324, and second tab 1340 includes a channel wall 1342, and a second fixation element 1344. First fixation element 1334 is removably attached to second fixation element 1344, covering gap 1350 in locations where bracket 1340 does not protrude through gap 1350.

Figure 12:
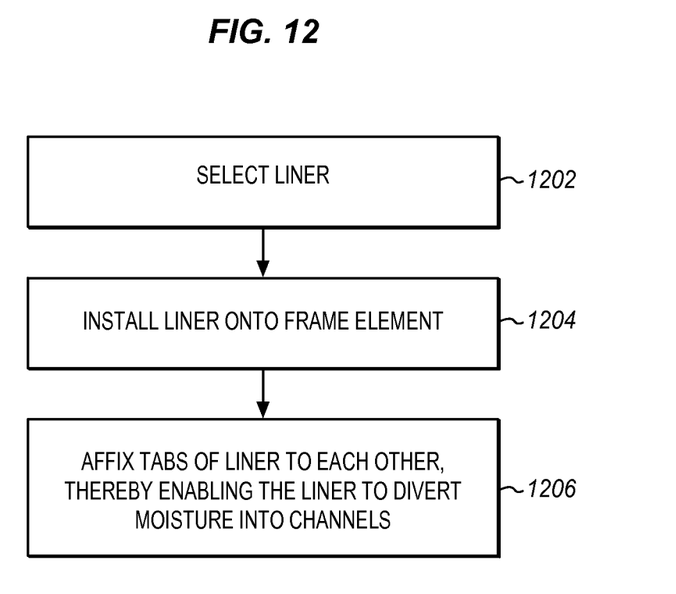
FIG. 12 is a flowchart illustrating a method for installing a liner in an exemplary embodiment.

FIG. 12 is a flowchart illustrating a method for installing a liner in an exemplary embodiment. According to FIG. 12, in step 1202, a technician identifies/selects a liner (i.e., liner 512 which exhibits enhanced drainage properties) to install onto a frame element 510. In step 1204, the technician installs the liner 512 onto frame element 510. This may comprise screwing, tying, or gluing liner 512 in place in order to affix liner 512 to frame element 510. In step 1206, the technician seals/affixes tabs of liner 512 to each other. This enables liner 512 to divert moisture dripping from frame element 510 into channels 950 and 960.

Figure 13:
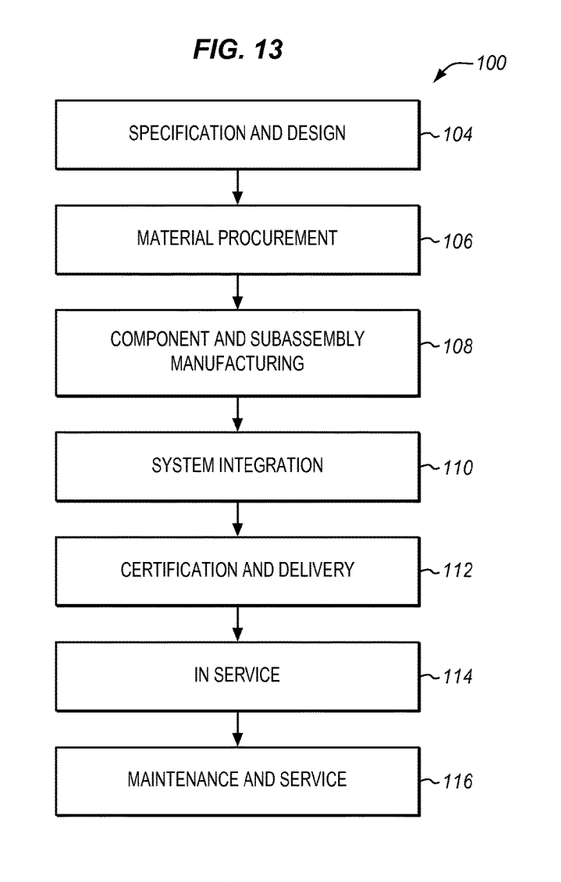
FIG. 13 is a flow diagram of aircraft production and service methodology in an exemplary embodiment.
Figure 14:
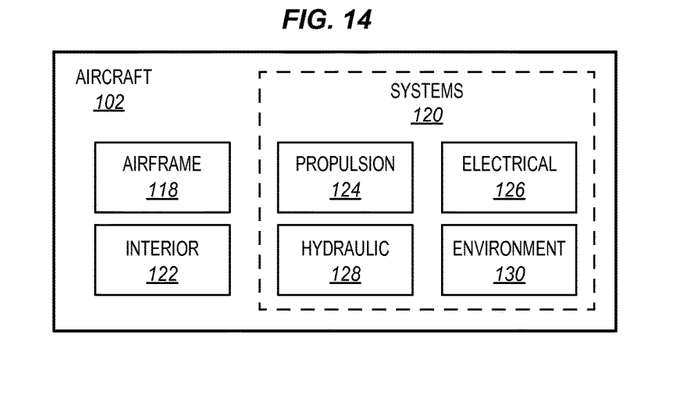
FIG. 14 is a block diagram of an aircraft in an exemplary embodiment.

Referring more particularly to the drawings, embodiments of the disclosure may be described in the context of an aircraft manufacturing and service method 100 as shown in FIG. 13 and an aircraft 102 as shown in FIG. 14. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on). In various embodiments, the improved techniques and components described herein may be utilized such that materials for liners are procured in stage 106, then utilized in stage 108 in order to assemble the materials into a liner in stage 108. In stage 110, the assembled liner may be attached to a frame of an aircraft, and in stage 114 the liner within the aircraft enhances drainage within an interior 122 while the aircraft is operating. In stage 116, the liner may be replaced or repaired by technicians for the aircraft.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production stage 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116. Although specific embodiments are described herein, the scope of the disclosure is not limited to those specific embodiments. The scope of the disclosure is defined by the following claims and any equivalents thereof.

The invention claimed is:

1. An apparatus comprising:
a liner configured to cover a frame element of an aircraft, the liner comprising:
a first waterproof lip that is attached to a first insulator and protrudes towards the frame element, the first waterproof lip and the first insulator form a first drainage channel for the frame element; and
a second waterproof lip that is attached to a second insulator and protrudes towards the frame element, the second waterproof lip and the second insulator form a second drainage channel for the frame element,
the first waterproof lip and the second waterproof lip each comprise a lengthwise fixation element that attaches the first waterproof lip to the second waterproof lip, sealing at least a portion of a lengthwise gap.

2. The apparatus of claim 1 wherein:
the fixation elements of the first waterproof lip and the second waterproof lip are detachably affixed to each other, enabling brackets extending from the frame element to protrude through the liner via the lengthwise gap.

3. The apparatus of claim 2 wherein:
the fixation elements are continuous features proximate to the lengthwise gap.

4. The apparatus of claim 1 wherein:
the frame element comprises a portion of a fuselage of the aircraft.

5. The apparatus of claim 1 wherein:
the fixation elements comprise hook and loop fasteners.

6. The apparatus of claim 1 wherein:
the fixation elements comprise pressure sensitive adhesives.

7. The apparatus of claim 1 wherein:
the first waterproof lip overlaps a distal portion of the second waterproof lip.

8. The apparatus of claim 7 wherein:
the first waterproof lip overlaps a left side and a right side of the second waterproof lip, and
the first waterproof lip comprises two lengthwise fixation elements, that each correspond with a different side of the second waterproof tab.

9. The apparatus of claim 1 wherein:
the drainage channels comprise arcuate pathways following a length of the frame element.

10. The apparatus of claim 1 wherein:
the first insulator is configured to cover a left side of the frame element along a lengthwise direction,
the second insulator is configured to cover a right side of the frame element along the lengthwise direction, and
the first insulator comprises a first lengthwise end and the second insulator comprises a second lengthwise end abutting the first lengthwise end, forming a lengthwise gap in the liner between the first lengthwise end and the second lengthwise end.

11. An apparatus comprising:
a liner for a frame element of an aircraft fuselage, the liner comprising:
elongate insulating portions covering the frame element along a length of the frame element, comprising ends that join to define a lengthwise slit between the elongate insulating portions; and
lengthwise waterproof tabs positioned on the ends of the insulating portions, each waterproof tab comprising a fixation element adapted to attach the waterproof tab to a fixation element of another waterproof tab,
the waterproof tabs protrude towards the ends of the frame elements and divert liquid into channels within the liner while the waterproof tabs are affixed to each other via the fixation elements.

12. The apparatus of claim 11 wherein:
the fixation elements of a first waterproof tab and a second waterproof tab are detachably affixed to each other, enabling brackets extending from the frame element to protrude through the liner via the lengthwise slit.

13. The apparatus of claim 12 wherein:
the fixation elements are continuous features proximate to the lengthwise slit.

14. The apparatus of claim 11 wherein:
the liner comprises an insulated cap strip, attached to an insulated bay blanket of the fuselage.

15. The apparatus of claim 11 wherein:
the fixation elements comprise hook and loop fasteners.

16. The apparatus of claim 11 wherein:
the fixation elements comprise pressure sensitive adhesives.

17. The apparatus of claim 11 wherein:
one of the waterproof tabs overlaps a distal portion of the other waterproof tab.

18. The apparatus of claim 11 wherein:
one of the waterproof tabs overlaps a left and a right side of the other waterproof tab, and
each of the waterproof tabs comprises two fixation elements.

19. The apparatus of claim 18 wherein:
each of the channels comprises an arcuate pathway following the frame element.

20. An apparatus comprising:
a frame element of an aircraft fuselage;
multiple brackets fixedly attached to the frame element; and
a cap strip liner for the frame element, comprising:
- elongate insulating portions covering the frame element along a length of the frame element, comprising ends that define a lengthwise slit; and
- lengthwise waterproof tabs positioned on the ends of the insulating portions, each waterproof tab comprising a fixation element adapted to attach the waterproof tab to a fixation element of another waterproof tab,
- the waterproof tabs prevent liquid from traveling through the lengthwise slit while the waterproof tabs are affixed to each other via the fixation elements.

21. The apparatus of claim 20 wherein:
the fixation elements of a first waterproof tab and a second waterproof tab are detachably affixed to each other, enabling brackets extending from a rib to protrude through a liner via the lengthwise slit.

22. A method comprising:
selecting a liner for a frame element of an aircraft;
installing the liner onto the frame element, by installing insulating portions of the liner along with waterproof tabs of the liner that protrude from the insulating portions towards the frame element; and
affixing tabs of the liner to each other thereby enabling the liner to divert moisture from the frame element into channels within the liner, the tabs each defining at least one wall of one of the channels.

23. The method of claim 22, wherein:
affixing the tabs of the liner comprises removably affixing the tabs of the liner to each other via fixation elements of the tabs.

24. The method of claim 22, wherein:
each tab protrudes from an end of the liner towards the frame element.

\* \* \* \* \*